(12) United States Patent
Schmid et al.

(10) Patent No.: US 12,064,823 B2
(45) Date of Patent: Aug. 20, 2024

(54) MILLING TOOL HAVING A REPLACEABLE CUTTING RING

(71) Applicant: KOMET DEUTSCHLAND GMBH, Besigheim (DE)

(72) Inventors: Frank Schmid, Deizisau (DE); Karl-Heinz Edelmann, Ehningen (DE)

(73) Assignee: Komet Deutschland Gmbh, Besigheim (DE)

( * ) Notice: Subject to any disclaimer, the term of this patent is extended or adjusted under 35 U.S.C. 154(b) by 0 days.

(21) Appl. No.: 16/694,554

(22) Filed: Nov. 25, 2019

(65) Prior Publication Data
US 2020/0086404 A1 Mar. 19, 2020

Related U.S. Application Data

(63) Continuation of application No. PCT/EP2018/064893, filed on Jun. 6, 2018.

(30) Foreign Application Priority Data

Jun. 6, 2017 (DE) ..................... 10 2017 112 374.1

(51) Int. Cl.
*B23C 5/28* (2006.01)
*B23C 5/06* (2006.01)
*B23Q 11/10* (2006.01)

(52) U.S. Cl.
CPC .................. *B23C 5/28* (2013.01); *B23C 5/06* (2013.01); *B23C 2210/168* (2013.01); *B23C 2250/12* (2013.01); *B23Q 11/10* (2013.01)

(58) Field of Classification Search
CPC .............. B23Q 11/10; B23C 2210/168; B23C 2226/125; B23C 2226/315;
(Continued)

(56) References Cited

U.S. PATENT DOCUMENTS 1,571,559 A * 2/1926 Smith ........................ B23C 5/18
266/120
2,377,773 A * 6/1945 Francis ...................... B23C 5/18
407/56
(Continued)

FOREIGN PATENT DOCUMENTS

DE 4400538 A1 * 7/1995
DE 1378372 A1 * 1/2004
(Continued)

OTHER PUBLICATIONS

DE 102005031988A1 (Foreign reference previously cited on Applicant's IDS filed Jun. 23, 2021) Machine Translation. (Year: 2023).*
(Continued)

*Primary Examiner* — Nicole N Ramos
(74) *Attorney, Agent, or Firm* — Bose McKinney & Evans LLP

(57) ABSTRACT

An inventive milling tool has a tool head that is rotatable about a tool axis and configured for coupling at its rear to a machine spindle. A plurality of cutting elements are distributed around the tool axis on a cutting circle, each cutting element provided with a front plane cutting edge and a peripheral cutting edge extending at an angle thereto. A channel system extends through the tool head and is configured for delivering coolant to the cutting elements. A replaceable ring is releasably fastened on a front end flange of the tool head in an interlocking manner, and the cutting elements are carried by the replaceable ring.

21 Claims, 3 Drawing Sheets

(58) Field of Classification Search
CPC ... B23C 2250/12; B23C 2260/68; B23C 5/06;
B23C 5/20; B23C 5/207; B23C 5/2234;
B23C 5/28; B23C 5/2252; B23C 5/226;
B23C 5/2226; B23C 2200/161; B23C
2200/0416; B23C 2200/125; B23C
2200/367; B23C 2210/244
See application file for complete search history.

(56) References Cited

U.S. PATENT DOCUMENTS

| | | | | |
|---|---|---|---|---|
| 2,678,487 | A * | 5/1954 | Onrud | B23C 5/2472 407/36 |
| 4,738,570 | A * | 4/1988 | Wertheimer | B23C 5/006 407/50 |
| 4,929,131 | A * | 5/1990 | Allemann | B23B 31/1075 279/8 |
| 5,061,129 | A * | 10/1991 | Baudermann | B23B 31/113 409/234 |
| 5,290,135 | A * | 3/1994 | Ball | B23F 21/22 407/11 |
| 5,848,858 | A * | 12/1998 | Jager | B23C 5/2226 407/34 |
| 7,497,153 | B2 * | 3/2009 | Brunton | B23D 59/02 407/11 |
| 7,625,157 | B2 * | 12/2009 | Prichard | B23C 5/2273 407/113 |
| 8,534,962 | B2 * | 9/2013 | Sjoo | B23B 31/1107 407/46 |
| 8,573,098 | B2 * | 11/2013 | Hoffer | B23C 5/28 82/50 |
| 2002/0009339 | A1 * | 1/2002 | Arvidsson | B23C 5/28 407/35 |
| 2002/0106251 | A1 | 8/2002 | Ripley | |
| 2004/0042858 | A1 * | 3/2004 | Sheffler | B24D 7/18 409/32 |
| 2007/0127992 | A1 * | 6/2007 | Spichtinger | B23C 5/006 407/39 |
| 2007/0283786 | A1 * | 12/2007 | Kappmeyer | B23B 27/002 76/101.1 |
| 2009/0226268 | A1 * | 9/2009 | Pilkington | B23C 5/28 407/113 |
| 2010/0143051 | A1 * | 6/2010 | Lutfi | B23C 5/28 407/11 |
| 2010/0272529 | A1 | 10/2010 | Rozzi et al. | |
| 2012/0141220 | A1 * | 6/2012 | Chen | B23B 31/11 409/136 |
| 2012/0198671 | A1 * | 8/2012 | Meidar | B23Q 11/1053 29/6.01 |
| 2013/0045059 | A1 * | 2/2013 | Bozkurt | B23C 5/18 409/131 |
| 2013/0223941 | A1 | 8/2013 | Bozkurt | |
| 2013/0302098 | A1 * | 11/2013 | Sjoo | B23F 21/16 407/11 |
| 2015/0298222 | A1 | 10/2015 | Ach et al. | |
| 2016/0107284 | A1 * | 4/2016 | Haimer | B23Q 11/1023 407/11 |
| 2017/0197256 | A1 * | 7/2017 | Zhang | B23C 5/006 |
| 2017/0252835 | A1 * | 9/2017 | Saffels | E01B 31/13 |
| 2017/0252839 | A1 * | 9/2017 | Donisi | B22F 10/20 |
| 2017/0368617 | A1 * | 12/2017 | Choi | B23C 5/08 |
| 2018/0185939 | A1 * | 7/2018 | Ning | B23P 15/46 |
| 2018/0229314 | A1 * | 8/2018 | Lifka | B23C 5/04 |
| 2018/0290218 | A1 * | 10/2018 | Ericson | B23C 5/08 |
| 2019/0210174 | A1 * | 7/2019 | Stephenson | B23C 5/28 |
| 2019/0232394 | A1 * | 8/2019 | Joly | B23C 5/06 |
| 2020/0055128 | A1 * | 2/2020 | Lehto | B23C 5/08 |

FOREIGN PATENT DOCUMENTS

| | | |
|---|---|---|
| DE | 10 2005 031 988 A1 | 1/2007 |
| DE | 10 2009 008 308 A1 | 2/2010 |
| DE | 10 2010 036 874 A1 | 2/2012 |
| EP | 2 484 471 A1 | 8/2012 |
| GB | 153211 A * | 11/1920 |
| GB | 563108 A * | 7/1944 |
| GB | 694292 A * | 7/1953 |
| JP | H 09-253915 A | 9/1997 |
| JP | 2015-054380 A | 3/2015 |
| WO | WO 97/10915 A1 | 3/1997 |

OTHER PUBLICATIONS

English translation of the International Search Report, PCT/EP2018/064893, Sep. 13, 2018, 4 pages.

English translation of the International Preliminary Report on Patentability and Written Opinion of the International Searching Authority, PCT/EP2018/064893, Dec. 19, 2019, 7 pages.

* cited by examiner

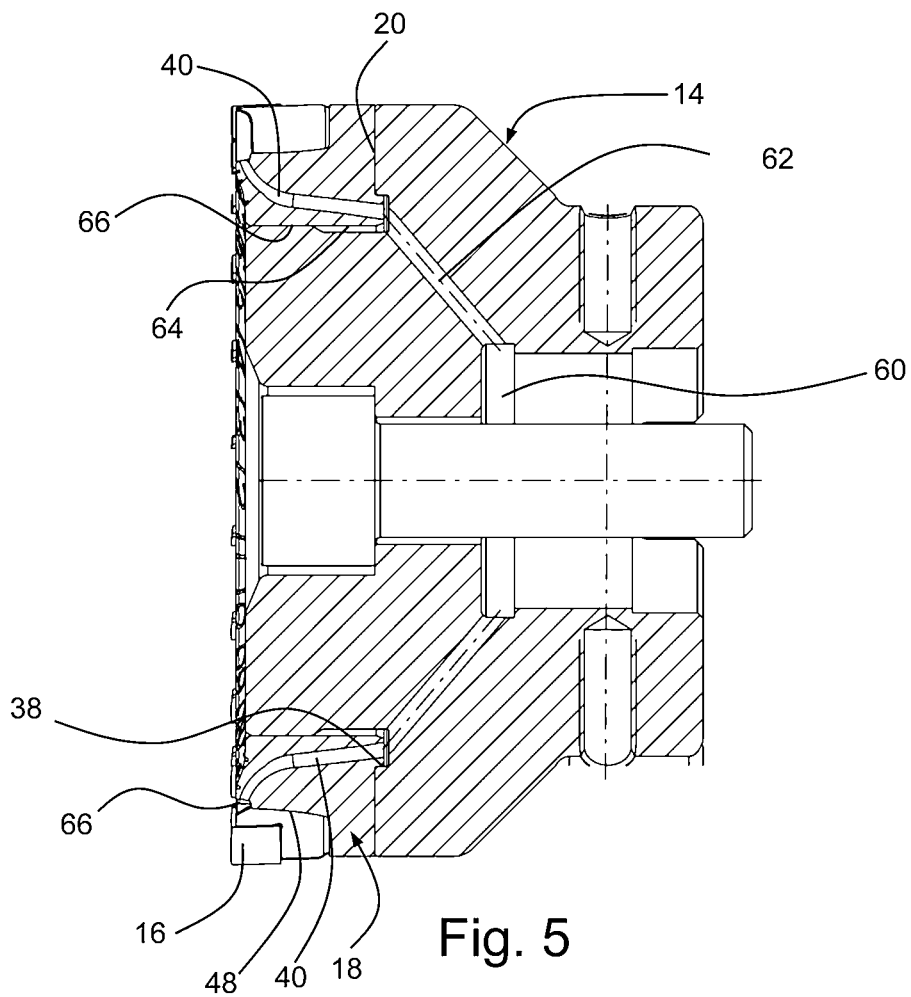
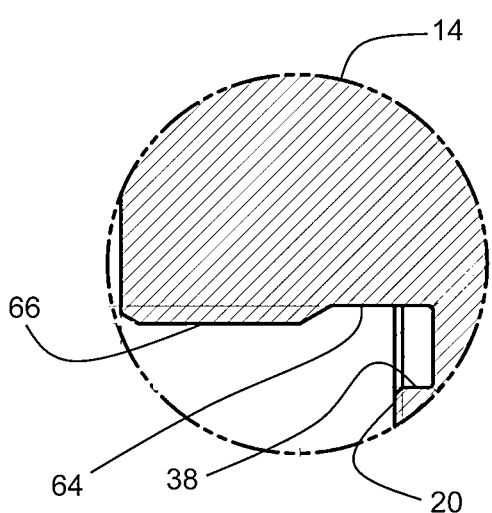
Fig. 6
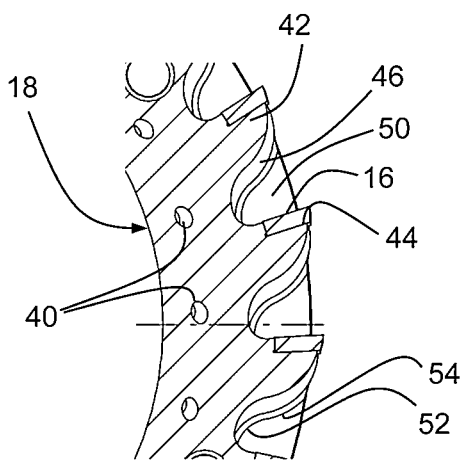
Fig. 7

MILLING TOOL HAVING A REPLACEABLE CUTTING RING

RELATED APPLICATIONS

This application is a continuation of PCT/EP2018/064893, filed Jun. 6, 2018, which claims priority to DE 10 2017 112 374.1, filed Jun. 6, 2017, the entire disclosures of both of which are hereby incorporated herein by reference.

BACKGROUND

This disclosure relates to a milling tool having a tool head which is rotatable about a tool axis and can be coupled at its rear to a machine spindle, a plurality of cutting elements for milling a workpiece, which cutting elements are arranged so as to be distributed around the tool axis on a cutting circle and are each provided with a front plane cutting edge and a peripheral cutting edge extending at an angle thereto, and a channel system extending through the tool head for delivering coolant to the cutting elements.

In high-performance cutting mills (referred to as HPCs), it is known to attach a plurality of cutting elements to the end face of a main body consisting of steel or aluminium. Said cutting elements are either firmly soldered on or are individually replaceable in the form of cartridges. A drawback of the firmly soldered cutting edges is that in the event of wear the entire main body as a whole has to be reloaded at the manufacturer, while the cartridges are removable; however, said cartridges have to be individually set to a common cutting circle. Owing to this conventional design, the tool layout, the shape of the flute and the coolant delivery system are highly dependent on machines and tools and are often not optimally selectable.

SUMMARY

This disclosure further improves the milling tools known in the prior art in order to avoid the above-mentioned drawbacks and to ensure an increased usage value to thereby achieve a high production quality.

This disclosure jointly provides the cutting elements on a functionally optimized support body. It is thus proposed according to this disclosure that a replaceable ring equipped with the cutting elements is placed on a front end flange of the tool head in an interlocking manner and releasably fastened there. As a result, the support for the cutting edges can be replaced at the end of its service life and can be replaced on site with little effort. Returning the entire tool to the manufacturer for reconditioning is no longer required. Overall, a milling tool having a highly modular construction is produced, which can be designed simply, in particular with respect to cutting materials, flute geometry and coolant delivery, depending on the use case.

The replaceable ring is advantageously provided with recesses for receiving one cutting element in each case, such that defined pre-positioning is ensured.

The cutting elements are advantageously formed in the manner of an insert and are adjusted so as to be inclined at an axial angle of from −20° to +45°, in particular from 10° to 20°, seen in the direction of the tool axis. The adjustment of the cutting edge with respect to the axis of rotation is thus significantly greater than is conventional, as a result of which the tool runs more smoothly and the burr formation on the component is minimized.

It is furthermore advantageous if the replaceable ring comprises a plurality of flutes associated individually with the cutting elements. As a result, owing to the shaping and design of the replaceable component, an optimal and reliable chip-forming process and chip removal system are ensured.

According to another advantageous embodiment, the flutes are delimited in the run-out region thereof by a radial surface of the replaceable ring extending in a radial plane transverse to the tool axis. By means of such flutes, almost without the usual flute run-out, the strength and stability of the replaceable ring or of the support for the cutting edges is significantly increased, while the installation space is considerably reduced. Furthermore, this shaping of the chip space facilitates chip guidance for radial chip removal.

In addition to the actual cooling and lubricating function, it is also advantageous for facilitating chip removal if the replaceable ring comprises a plurality of coolant distribution channels which are associated individually with the cutting elements and extend so as to be curved at least in portions and/or so as to have a variable cross section.

For simple coolant transfer, it is advantageous if the coolant distribution channels branch off from an annular groove of the tool head.

The coolant distribution channels advantageously each have an outlet opening which faces rearward against the tool feed motion or is oriented transversely thereto, such that the coolant is guided toward the cutting process in a targeted manner and the chip removal system and the service life can be improved.

In another embodiment, the replaceable ring is in the form of a preferably one-piece 3D-printed part or shaped part produced in an additive manufacturing process. In an additively formed component of this kind, a complex component geometry can be ensured for optimized coolant delivery, flute shape and also adjustment of the cutting edges.

For simple replaceability, it is also favorable if the replaceable ring is provided with threaded bores for screwing in retaining screws mounted in the tool head.

For securing against centrifugal forces at the point of separation, it is advantageous if the end flange comprises an annular axial groove in which an annular collar of the replaceable ring engages.

The component geometry is further optimized by the replaceable ring having a toothed rim contour, the radially outwardly facing teeth of which support a cutting element on one tooth flank and delimit a flute on the other tooth flank.

In order to facilitate chip removal and to avoid chip accumulation, it is advantageous if the replaceable ring has, opposite each cutting element, a chip-removing surface which extends in a curve in radial cross section and comprises an internal concave portion and an external convex portion.

A further improvement in terms of enhanced modular construction can be achieved by a plurality of replaceable rings having a varying number of cutting elements being provided, which elements can optionally be fastened to the end flange of the tool head.

Advantageously, the cutting elements are non-releasably or firmly soldered directly into the replaceable ring, preferably as PCD cutting elements. As a result, the required installation space for the cutting edges can be made substantially more compact, as a result of which, in comparison with releasable cutting edges, overall considerably more cutting edges can be attached so as to be distributed around the circumference. The more cutting edges can be mounted on the mill, the more effectively the tool can be used. A second aspect of designing the cutting edges to be nonreleasable consists in the positional tolerance increasing with each interface (seat and cutting element) and thus the true running is impaired.

In this context, it is particularly advantageous that the true running or the axial positional tolerance of the plane cutting edges is less than 0.02 mm, preferably is approximately 0.005 mm. Such tool precision of a surface milling cutter can be achieved by firmly soldered cutting elements, with complex alignment of individually settable cartridges no longer being required.

A further improvement can be achieved by more than 22 cutting elements, preferably more than 30 cutting elements, being firmly soldered into the replaceable ring.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 5 is an axial cross section of the milling tool through the region of coolant distribution channels;

FIG. 6 is an enlarged section of FIG. 5 in a flange region of the tool head; and FIG. 7 shows a reduced radial cross section through the replaceable ring.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

It shall be understood that terms such as "horizontal" and "vertical" are generally used herein to establish positions of individual components relative to one another rather than an absolute angular position in space. Further, regardless of the reference frame, in this disclosure terms such as "vertical," "parallel," "horizontal," "right angle," "rectangular" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "cutting element," "cutting edge," and "channel," to name just a few, should be interpreted when appearing in this disclosure and claims to mean "one or more" or "at least one." All other terms used herein should be similarly interpreted unless it is made explicit that a singular interpretation is intended.

Figure 1:
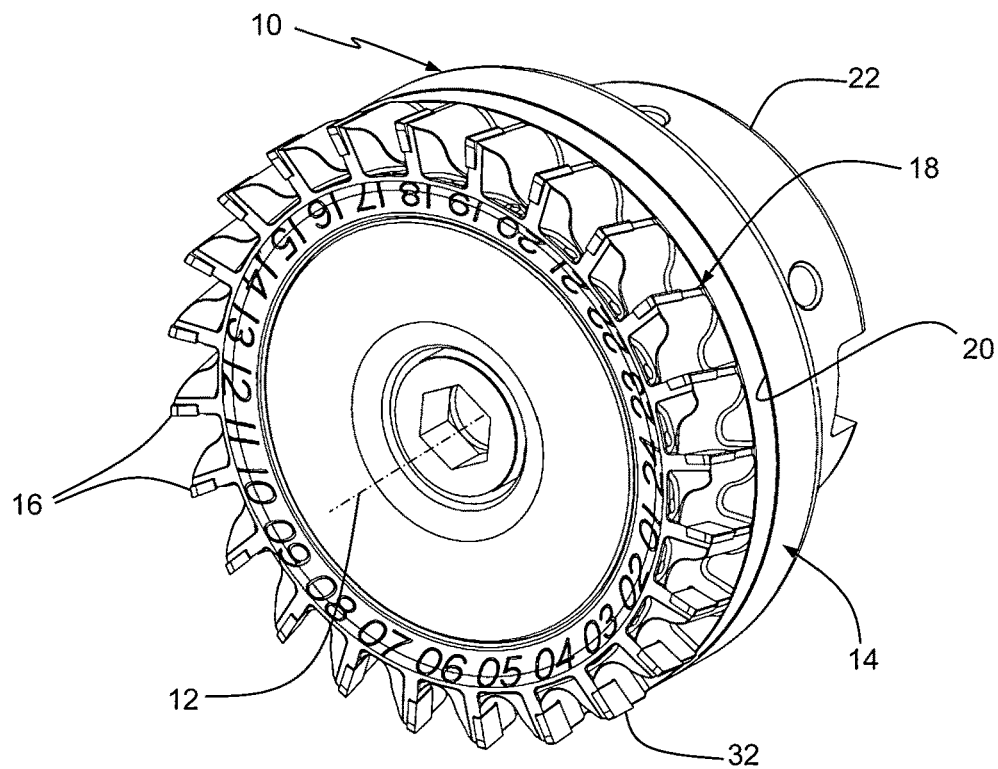
FIG. 1 is a front perspective view of a milling tool including a tool head and a replaceable ring for the cutting inserts.

The surface milling tool 10 shown in FIG. 1 includes a tool head 14 which is rotatable about its central axis, in the form a tool axis 12, and a replaceable ring 18 which is equipped with a plurality of cutting elements or cutting inserts 16 and is placed on a front end flange 20 of the tool head 14 in an interlocking manner and releasably fastened there.

Figure 2:
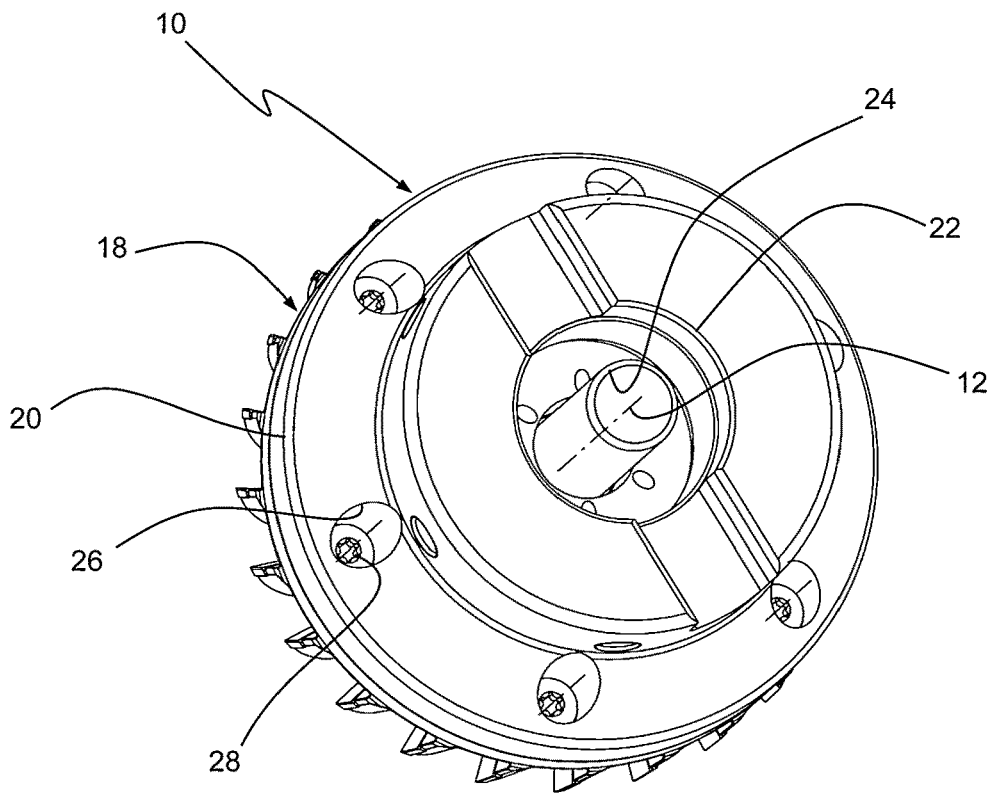
FIG. 2 is a rear perspective view of the milling tool according to FIG. 1.

As can also be seen in FIG. 2, the tool head 14, in the form of a shell end mill 14, has a rear interface 22 for coupling to a milling receptacle (not shown); said head is retained on said receptacle in a rotationally fixed manner by means of an axial screw connection. Alternatively, the replaceable ring 18 can also be screwed directly onto a separate receptacle in a monobloc construction (not shown).

Stepped bores 26 which are distributed in the circumferential direction on the rear of the annular end flange 20 are arranged so as to support, on the head side, retaining screws 28 for the replaceable ring 18.

Figure 3:
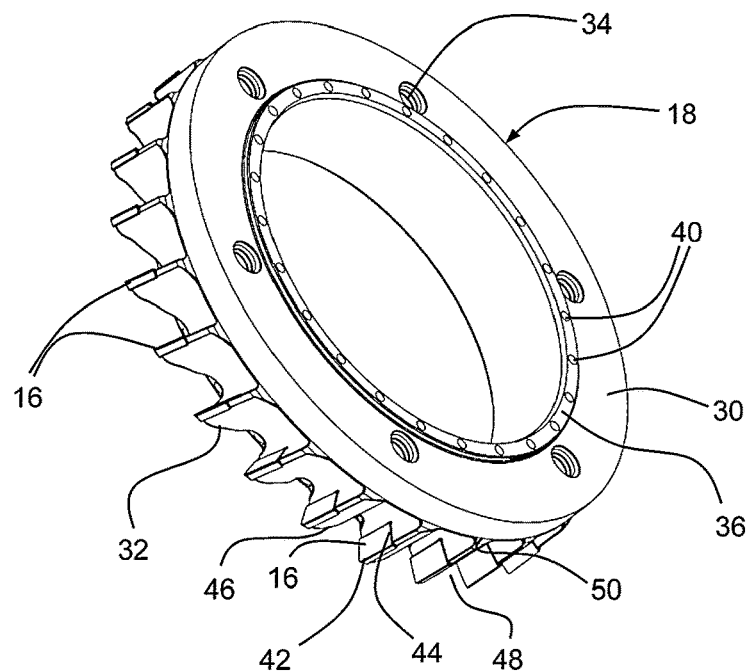
FIG. 3 is a rear perspective view of the replaceable ring.

The replaceable ring 18 shown separately in FIG. 3 includes a support disc 30, on the front of which a toothed rim contour 32 for retaining the cutting inserts 16 is formed. Axial threaded bores 34 are introduced at the rear of the support disc 30, which bores are aligned with the stepped bores 26 in the tool head 14 in order to screw in the retaining screws 28. A rearwardly projecting annular collar 36 of the replaceable ring 18 allows said collar to be interlockingly received in the end flange 20 in a manner in which it is secured against centrifugal forces. For this purpose, an annular axial groove 38 is introduced in the end flange 20, as can be seen in FIG. 6. Inlet openings of coolant distribution channels 40 are distributed over the annular collar 36, the course of which channels to the cutting inserts 16 is not explained in more detail in the following.

The toothed rim contour 32 of the replaceable ring 18 comprises radially outwardly protruding teeth 42, which are provided, on the tooth flank thereof facing in the direction of rotation, with recesses 44 for the cutting inserts 16, while the opposite tooth flank forms a complexly curved chip-removing surface 46. In this way, flutes 48 between the teeth 42 are kept free, which flutes are delimited in the run-out region thereof by a radial surface 50 of the support disc 30.

As can be best seen from FIG. 7, the tooth flanks are flat adjacent to the insert seats or recesses 44. In order to optimize chip removal, the opposite curved tooth flank comprises an internal portion 52 that is concave in radial cross section and an outer convex portion 54.

As can be seen in FIG. 1 based on the numbering, twenty-four teeth form the circumferential toothed rim contour 32 in the embodiment. Owing to the additive formation of the replaceable ring 18, it is easily possible to provide a larger number of teeth or cutting edges, for example 32 for a nominal diameter of 100 mm. In principle, it is also possible to provide a plurality of replaceable rings 18 having a varying number of cutting edges, but matching interlocking contours for the end flange 20 in a modular manner, in order to allow additional flexibility for the user.

The cutting inserts 16 are directly firmly soldered into the recesses 44. A high-precision true running of, for example, 0.005 mm of axial tolerance is achieved by corresponding grinding-in in the soldered state. Cutting edges made of a polycrystalline diamond cutting material (PCD) or cutting edges made of cubic boron nitride (CBN) are preferably used.

It can also be seen in FIG. 1 that the cutting inserts 16 are tilted sharply forward at an axial angle with respect to the tool axis 12 (or with respect to a parallel line thereto). The tilt can be adapted to the sharpness of the cutting edge or to the cutting material, an axial angle of up to 45° being conceivable for hard metal and cermet, while for PCD cutting edges an axial angle of from 10° to 20° is preferred. For CBN cutting edges for hard machining, negative axial angles of up to −20° may also be suitable.

Figure 4:
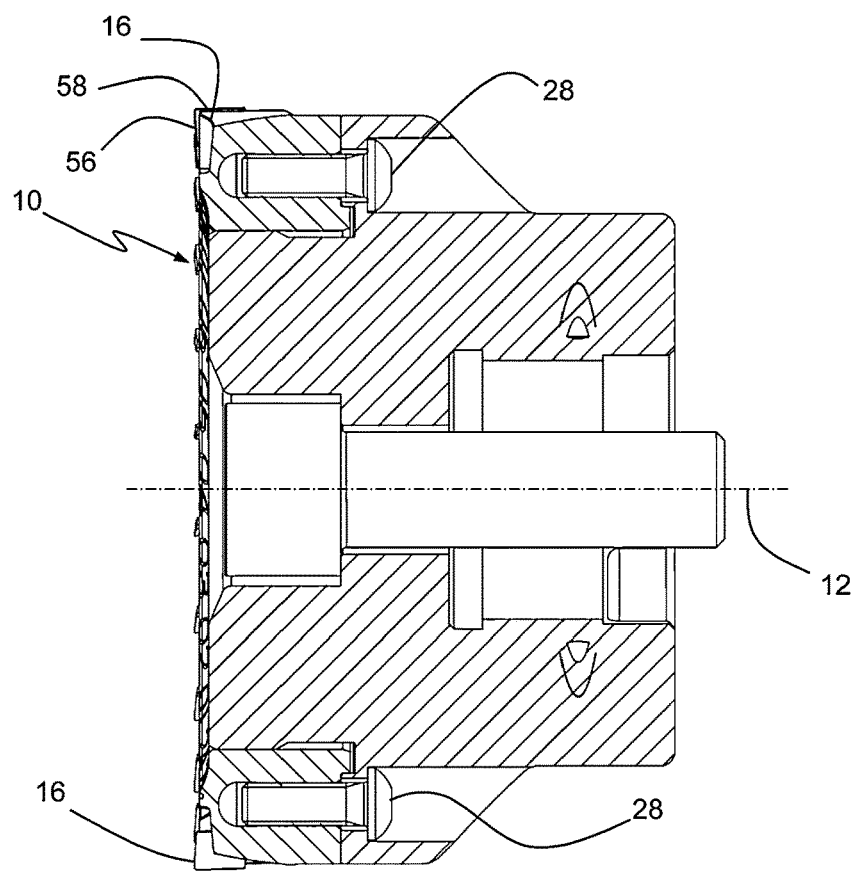
FIG. 4 is an axial cross section of the milling tool through the region of bores for retaining screws for fastening the replaceable ring.

As can be best seen from FIG. 4, the cutting inserts 16 have a front plane cutting edge 56 which faces forward in the direction of the tool axis 12 and a peripheral cutting edge 58 which extends at an angle thereto and faces radially outward. When machining a workpiece by surface milling, the milling tool 10 is moved transversely to the central axis 12 and rotated in the circumferential direction, the cutting inserts 16 removing the material by machining and the chips being conducted away through the flutes 48 in a targeted manner with the aid of the coolant diverted rearward, as will be explained in more detail in the following.

The cooling lubricant is delivered via a channel system 60 starting from a central rear connection to the tool head, as shown in FIG. 5. From there, branch bores 62 branch off which lead to the annular axial groove 38. The depression 64 in the region of the inner flank of the axial groove 38 makes it possible to machine the lateral surface 66 in a precisely fitting manner in order to radially support the replaceable ring 18 on the inside (see also FIG. 6). The cooling lubricant is transferred to the individual coolant distribution channels 40 of the replaceable ring 18 via the bottom region of the axial groove 38. Said channels lead, in each case having a curved course and variable cross section, to an associated cutting insert 16, the outlet opening 66 in the flute 48 facing rearward against the tool axis 12 such that chip removal is facilitated in a targeted manner. The shell end mill 14 comprising the replaceable ring 18 is also suitable for use with minimal amounts of lubrication.

In order to produce the replaceable ring in the complex structure described above, an additive manufacturing process such as selective laser melting can be used. In the replaceable ring 18 formed in such a way as a 3D-printed part, there are thus degrees of freedom in the design of the toothed rim contour 32 and the inner coolant guidance system which cannot be achieved by material-removing manufacturing methods.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A milling tool, comprising:
    a tool head having a front end and a rear end, the tool head being rotatable about a tool axis;
    a replaceable ring having a first end and a second end, wherein the replaceable ring is placed on the tool head in an interlocking manner and releasably fastened thereto; and
    a channel system;
    wherein the front end of the tool head has an annular end flange comprising a plurality of stepped bores on a rear of the annular end flange;
    wherein the replaceable ring comprises on the first end, a plurality of cutting elements distributed around the tool axis, and on the second end a plurality of threaded bores;
    wherein in a cross-sectional view, the front end flange protrudes perpendicular from the tool axis such as to receive and fasten the replaceable ring therein via retaining screws disposed within the plurality of stepped bores and the plurality of axially threaded bores;
    wherein the cutting elements are non-releasably soldered on the replaceable ring such that the replaceable ring and cutting elements are removable from the tool head as a single unit;
    wherein the channel system extends through the tool head and replaceable ring for delivering coolant to the cutting elements; the channel system comprises a plurality of enclosed coolant distribution channels associated individually with the cutting elements, wherein at least portions of the enclosed distribution channels have a curved fluid pathway in the direction of fluid flow, wherein the milling tool is a surface milling tool.

2. The milling tool according to claim 1, wherein the replaceable ring has recesses, each recess receiving a respective one of the cutting elements.

3. The milling tool according to claim 1, wherein the cutting elements are formed as inserts and are inclined at an axial angle of from −20° to +45° as seen in the direction of the tool axis.

4. The milling tool according to claim 3, wherein the cutting elements are formed as inserts and are inclined at an axial angle of from +10° to +20° as seen in the direction of the tool axis.

5. The milling tool according to claim 1, wherein the replaceable ring comprises a plurality of flutes individually associated with the cutting elements.

6. The milling tool according to claim 5, wherein the flutes are delimited by a radial surface of the replaceable ring.

7. The milling tool according to claim 1, wherein the distribution channels have a variable cross section.

8. The milling tool according to claim 7, wherein the coolant distribution channels branch off from an annular groove in the tool head.

9. The milling tool according to claim 7, wherein the coolant distribution channels each comprise an outlet opening facing in a direction against a tool feed motion.

10. The milling tool according to claim 1, wherein the replaceable ring is formed as a one-piece 3D-printed part.

11. The milling tool according to claim 1, wherein the end flange comprises an annular axial groove in which an annular collar of the replaceable ring engages.

12. The milling tool according to claim 1, wherein the replaceable ring has a toothed rim contour having radially outwardly facing teeth, wherein the teeth have one tooth flank that supports the cutting elements and another tooth flank that delimits a flute.

13. The milling tool according to claim 1, wherein the replaceable ring has, opposite each cutting element, a chip-removing surface extending in a curve in radial cross section and comprises an internal concave portion and an external convex portion.

14. The milling tool according to claim 1, wherein the replaceable ring is replaceable with a second replaceable ring having a different number of cutting elements.

15. The milling tool according to claim 1, wherein the cutting elements are soldered directly into the replaceable ring.

16. The milling tool of claim 15, wherein the cutting elements are PCD cutting elements.

17. The milling tool according to claim 1, wherein the cutting inserts each have a front plane cutting edge, and wherein an axial positional tolerance of the plane cutting edges is less than 0.02 mm.

18. The milling tool according to claim 17, wherein the axial positional tolerance of the plane cutting edges is less than 0.005 mm.

19. The milling tool according to claim 1, wherein more than 22 cutting elements are soldered into the replaceable ring.

20. The milling tool according to claim 1, wherein the distribution channels extend radially outward.

21. The milling tool according to claim 1, wherein the coolant distribution channels are contained within the replaceable ring.

* * * * *